US010986927B2

(12) United States Patent
Fiden

(10) Patent No.: US 10,986,927 B2
(45) Date of Patent: Apr. 27, 2021

(54) VIDEO-CASTER CHAIR

(71) Applicant: Cloud9 Esports, Inc., Santa Monica, CA (US)

(72) Inventor: Daniel P. Fiden, Holualoa, HI (US)

(73) Assignee: Cloud9 Esports, Inc., Santa Monica, CA (US)

(*) Notice: Subject to any disclaimer, the term of this patent is extended or adjusted under 35 U.S.C. 154(b) by 38 days.

(21) Appl. No.: 16/237,094

(22) Filed: Dec. 31, 2018

(65) Prior Publication Data

US 2020/0205574 A1 Jul. 2, 2020

(51) Int. Cl.
*B60N 2/58* (2006.01)
*B60N 2/60* (2006.01)
*A47C 7/62* (2006.01)
*A47C 3/20* (2006.01)
*A47C 1/03* (2006.01)
*A47C 7/42* (2006.01)
*A47C 7/46* (2006.01)

(52) U.S. Cl.
CPC .......... *A47C 7/62* (2013.01); *A47C 1/03* (2013.01); *A47C 3/20* (2013.01); *A47C 7/42* (2013.01); *A47C 7/46* (2013.01); *B60N 2/58* (2013.01); *B60N 2/60* (2013.01)

(58) Field of Classification Search
CPC ....... A47C 1/03255; A47C 7/386; A47C 7/62; B60N 2/58; B60N 2/60
USPC .................................................. 297/DIG. 6
See application file for complete search history.

(56) References Cited

U.S. PATENT DOCUMENTS

| 4,979,778 | A | * | 12/1990 | Shields | A47C 1/03255 |
| | | | | | 297/300.2 |
| 5,533,787 | A | * | 7/1996 | Xiang | B60N 2/66 |
| | | | | | 297/284.5 |
| 6,899,391 | B1 | * | 5/2005 | Schneller | A47C 1/13 |
| | | | | | 297/188.04 |
| 7,303,235 | B1 | * | 12/2007 | Fongers | A47C 1/121 |
| | | | | | 297/217.7 |
| 7,523,991 | B2 | * | 4/2009 | Thompson | B60N 2/58 |
| | | | | | 297/452.38 |
| 7,600,335 | B2 | * | 10/2009 | Suprina | G09F 7/06 |
| | | | | | 297/217.1 |
| 7,802,848 | B2 | * | 9/2010 | Suprina | A47C 1/12 |
| | | | | | 297/230.12 |
| 9,199,739 | B2 | * | 12/2015 | Hasegawa | B64D 11/06 |
| 9,824,611 | B2 | * | 11/2017 | Bruce | G09F 23/00 |
| D852,563 | S | * | 7/2019 | Shen | D6/716 |
| D859,865 | S | * | 9/2019 | Berlinches | D6/366 |
| D869,214 | S | * | 12/2019 | Chen | D6/716 |
| 10,589,688 | B2 | * | 3/2020 | Diaz Paredes | B60R 7/005 |
| 10,653,242 | B2 | * | 5/2020 | Ortiz | A47C 1/00 |

(Continued)

FOREIGN PATENT DOCUMENTS

DE 202018006245 U1 * 10/2019 ............. A47C 7/383
WO WO-2017176231 A2 * 10/2017 ............. A63F 13/98

OTHER PUBLICATIONS

"US Launch Promotion", 6 pages, downloaded from https://web.archive.org/web/20170603222338/https:/secretlab.co/us on Aug. 25, 2020.

*Primary Examiner* — Timothy J Brindley
(74) *Attorney, Agent, or Firm* — Perkins Coie LLP; Colin Fowler

(57) ABSTRACT

A customizable chair is disclosed that includes an "over-the-shoulder" region where users can affix graphic patches. The region that the graphic patches are placed is visible from a number of perspectives including a user-broadcaster sitting in the chair.

18 Claims, 8 Drawing Sheets

(56) References Cited

U.S. PATENT DOCUMENTS

| | | | |
|---|---|---|---|
| D885,779 S * | 6/2020 | Li | D6/366 |
| 2002/0047294 A1 * | 4/2002 | Ellinidis | A47C 1/13 |
| | | | 297/188.04 |
| 2006/0284438 A1 * | 12/2006 | Carty | B60R 9/00 |
| | | | 296/37.6 |
| 2011/0043006 A1 * | 2/2011 | Butt | A63F 13/98 |
| | | | 297/68 |
| 2012/0175926 A1 * | 7/2012 | McKinney | A47C 31/11 |
| | | | 297/220 |
| 2012/0200130 A1 * | 8/2012 | Brinker | B60N 2/6063 |
| | | | 297/220 |
| 2013/0033077 A1 * | 2/2013 | Belnick | A47C 7/386 |
| | | | 297/220 |
| 2014/0252819 A1 * | 9/2014 | Andrade | B29C 65/56 |
| | | | 297/188.04 |
| 2014/0265464 A1 * | 9/2014 | Hurlburt | A47C 13/00 |
| | | | 297/183.1 |
| 2015/0044394 A1 * | 2/2015 | Aikey | B44C 1/105 |
| | | | 428/7 |
| 2016/0015180 A1 * | 1/2016 | Ramirez | A47C 7/021 |
| | | | 297/188.2 |
| 2016/0206106 A1 * | 7/2016 | Labowitz | B60N 2/90 |
| 2016/0304247 A1 * | 10/2016 | Lewison, Jr. | A47C 4/02 |
| 2017/0013960 A1 * | 1/2017 | Richardson | A47C 3/00 |
| 2017/0354256 A1 * | 12/2017 | Peterson | A47C 1/03233 |
| 2018/0098634 A1 * | 4/2018 | Smith | A47C 3/04 |
| 2018/0325262 A1 * | 11/2018 | Richardson | A47C 7/705 |
| 2019/0281984 A1 * | 9/2019 | Richardson | A61G 15/007 |
| 2020/0069059 A1 * | 3/2020 | Ortiz | G09B 9/04 |

* cited by examiner

VIDEO-CASTER CHAIR

TECHNICAL FIELD

The disclosure relates to chairs, and more specifically, to chairs configured to use during video broadcasts.

BACKGROUND

The format of some video broadcasts includes a video subject (such as a host) sitting in a chair. In some circumstances portions of the chair are visible on the video broadcasts. Some such video broadcasts are of people playing video games, where video of the people playing may be streamed over the Internet.

DETAILED DESCRIPTION

Many broadcasters appear on video in circumstances where the top portions of a chair they are seated in are visible in the video. One such circumstance where the user sits in high-backed chairs on video is where the user video streams herself. Some video streams show the user playing a video game using a streaming video service such as YouTube or Twitch.TV. Further, in some circumstances a number of players appear together in a video stream, each in their own chair.

Collectively, and regardless of circumstance, the user sitting in the chair is referred to as "a broadcaster" in this specification. That is, if the broadcaster herself is generating the broadcast, or if another entity/party is causing video data to be cast over some medium known for use in video consumption, the user in the chair is generally referred to as a "broadcaster." Further, the term "broadcast" is intended to encompass not only broadcast in a strict sense but also multicast, unicast, or other video distribution configurations.

Broadcasters and/or their employers are interested in their appearance and the appearance of their surroundings on screen. It follows that the broadcasters like to customize their visual surroundings on screen. Providing additional outlets of customization is useful. Affixing or integrating a fastening material to a display region of the broadcaster's chair that is visible to viewers enables the broadcaster to position selected patches, such as the name and/or logo of a gaming team or sponsor, in sight of the viewers. Patches, including graphic patches, affixed in this manner allow the broadcaster to express themselves or advertise for sponsors.

Figure 1:
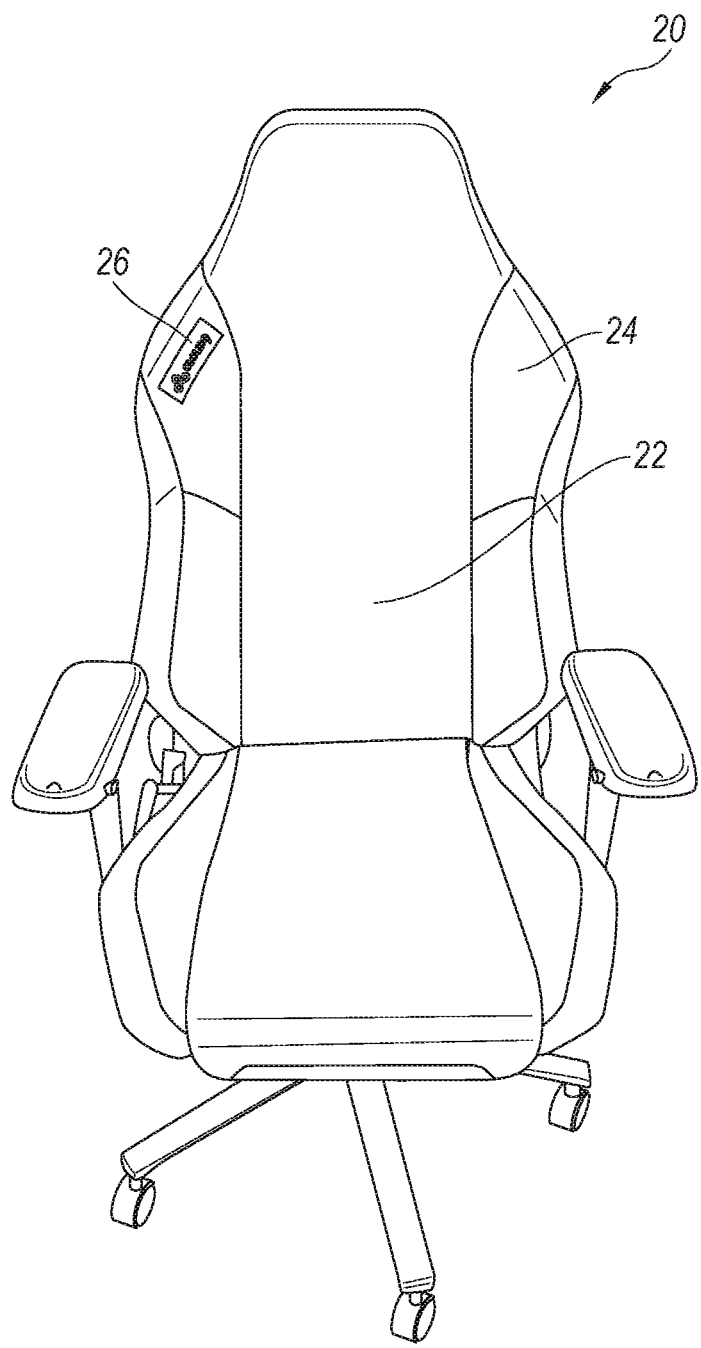
FIG. 1 is an illustration of a front view of a gaming chair.

FIG. 1 is an illustration of a front view of a gaming chair according to at least one embodiment. The pictured chair is a gaming chair, and other figures herein include gaming chairs; however, this disclosure may apply to any type of chair that can physically support relevant components. A chair includes a number of known components including a backrest 22. The chair 20 includes a display region positioned along an outer edge of an upper portion of the backrest 22 above a lumbar region, that includes a fastening material 24. The fastening material 24 enables the affixing of graphic patches 26 that may be freely placed and removed as users see fit. In some embodiments, the display region is positioned on wings or ears (hereafter "wings") of the chair 20 next to the head and/or shoulder of the user/broadcaster. In some embodiments the wing is positioned in the upper half of the backrest 22 above a lumbar region. The wings extend outward to either side of the chair and provide additional surface area on the backrest 22. In some embodiments, the wings are an attachment to the backrest 22 and are removable. Some chairs 20 additionally include wheels, a reclining mechanism, and/or a height adjustment mechanism (not shown).

Examples of fastening material 24 include: hook and loop matching fabric (ex: VELCRO), micro-peg fabric, magnetic fabric/paneling, or adhesive material. There are a number of embodiments of hook and loop fabric. Embodiments include coarse and soft VELCRO. In some embodiments, the loop side of the fabric is used for the fastening material 24 so as to avoid hooking to hair and other clothing of the broadcaster. However, the hook side of the hook and loop fabric may also be used as the fastening material 24. Micro-peg fabric is similar to hook and loop fabric in that micro-peg fabric uses a two-sided mating fabric. However, instead of a hook side and a loop side, both sides include a dense series of pegs that intermingle and create resistance to movement once mated. Micro-peg fabric resists lateral movement but has little resistance to vertical movement. Micro-pegs do not have hooks that attach themselves to hair/clothes, or loops that fray over time.

Magnetic fabric/paneling may include use of hard magnets (permanent magnets) or softly magnetic materials (ferromagnets). In some embodiments the magnetic fabric/paneling is flexible in order to improve comfort of the chair 20. Where the fastening material 24 is a ferromagnet, the graphic patches 26 are permanent magnets (and vice-versa).

There are further a number of embodiments of fastening material 26 as adhesive material. For example, the adhesive material may be a sticky surface, a malleable gel, or a reusable sticky surface with a transparent non-sticky covering. Where a transparent non-sticky covering is used, the covering is removed completely or partially, and the graphic patch is applied to the sticky surface. Afterwards, the transparent cover is reapplied to prevent the adhesive from sticking to the broadcaster or their clothes.

In some embodiments, rather than fastening material 24, the chair 20 makes use of a windowed pocket that the graphic patches 26 may be inserted into and seen through.

Figure 2A:
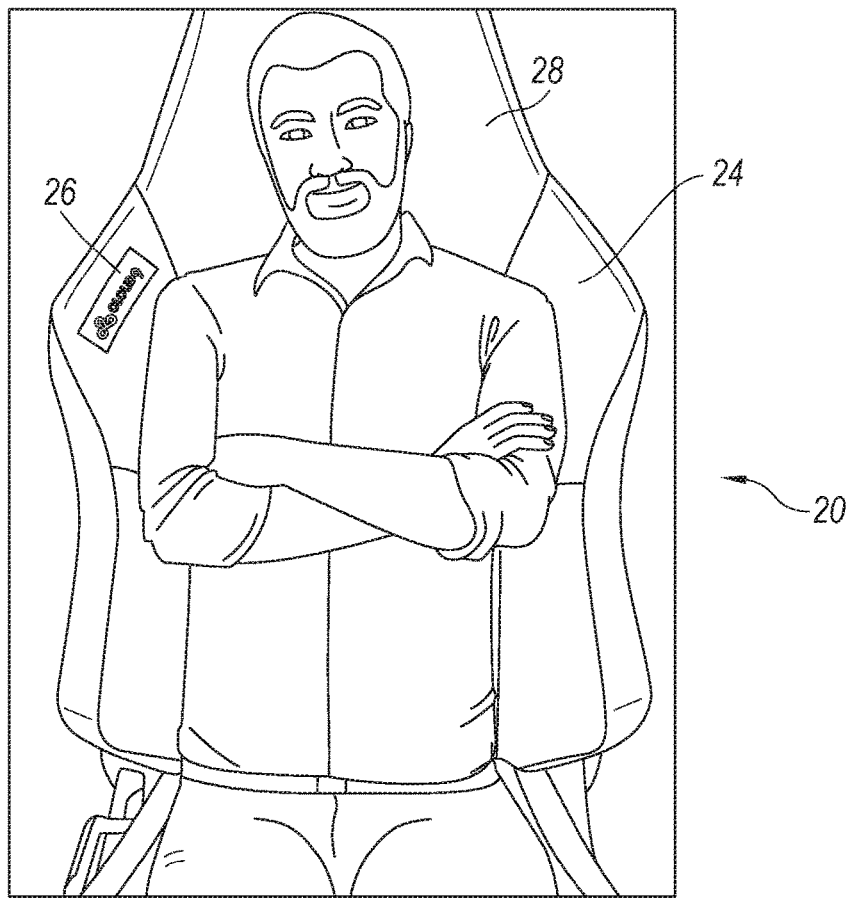
FIG. 2A is an illustration of a front view of a gaming chair in use with a graphic patch.
Figure 2B:
FIG. 2B is an illustration of a perspective view of a gaming chair in use with a graphic patch.

FIGS. 2A and 2B are illustrations of views of a gaming chair in use with a graphic patch. Where the broadcaster 28 is seated in the chair 20, the graphic patch 26 is still visible from a front or side perspective.

Figure 3:
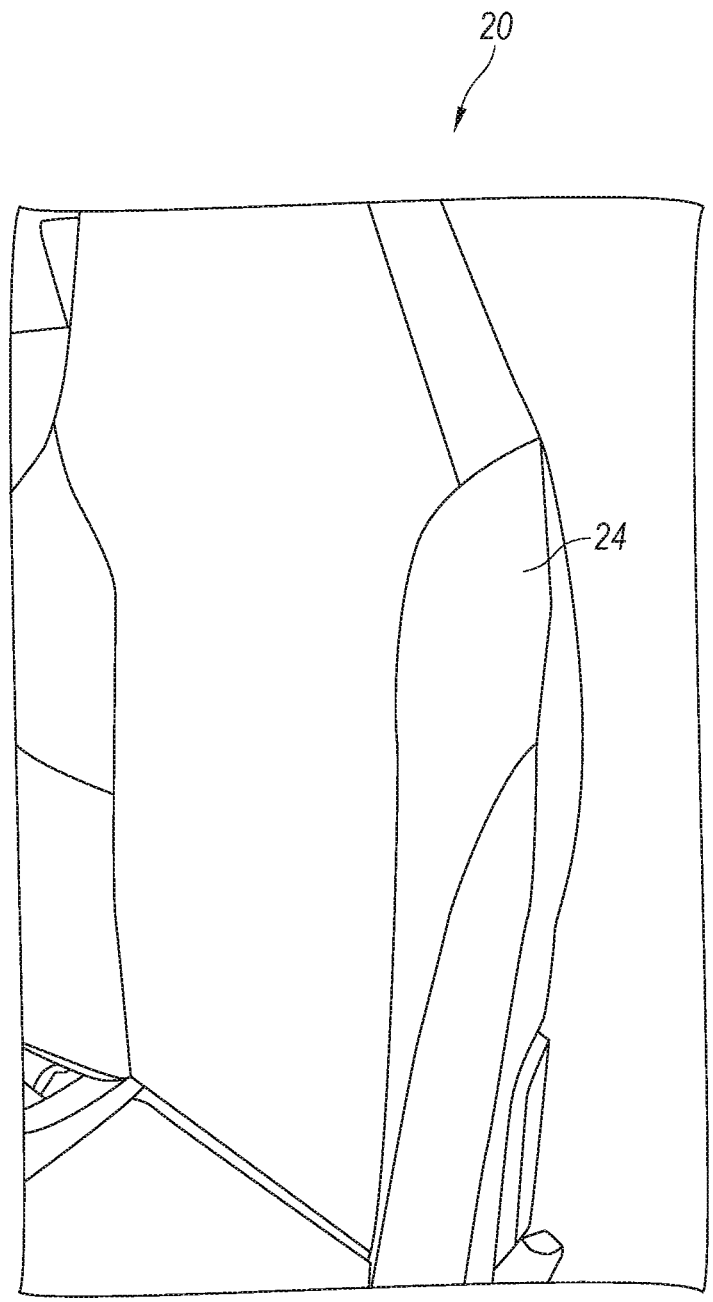
FIG. 3 is a right-side view of a gaming chair.
Figure 4:
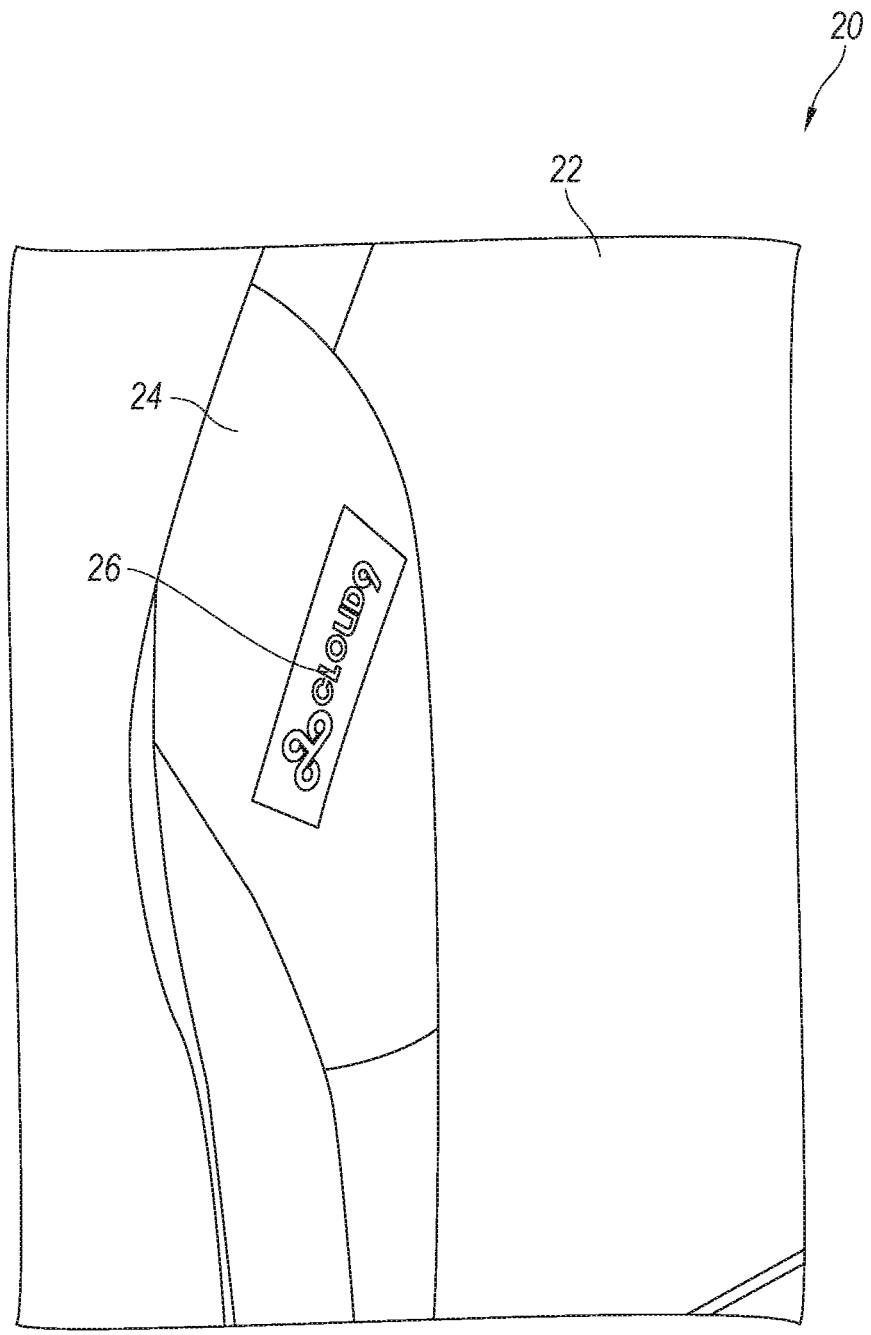
FIG. 4 is a left-side view of a gaming chair.

FIG. 3 is a right-side view of a gaming chair.
FIG. 4 is a left-side view of a gaming chair.

Figure 5A:
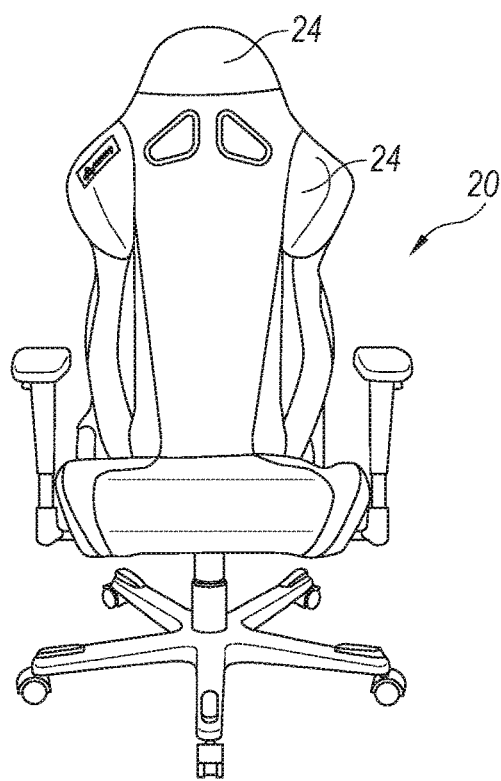
FIG. 5A is an illustration of an embodiment of a gaming chair including three regions of fastening material.

FIG. 5A is an illustration of an embodiment of a gaming chair 20 including three regions of fastening material 24. The chair 20 of FIG. 5A includes both wings and a top cap region that include fastening material 24.

Figure 5B:
FIG. 5B is an illustration of an embodiment of a gaming chair including a large cap region of fastening material.

FIG. 5B is an illustration of an embodiment of a gaming chair 20 including a large cap region of fastening material 24. The chair 20 of FIG. 5B includes a joined wing and cap region that includes a single large cap region of fastening material 24.

Figure 5C:
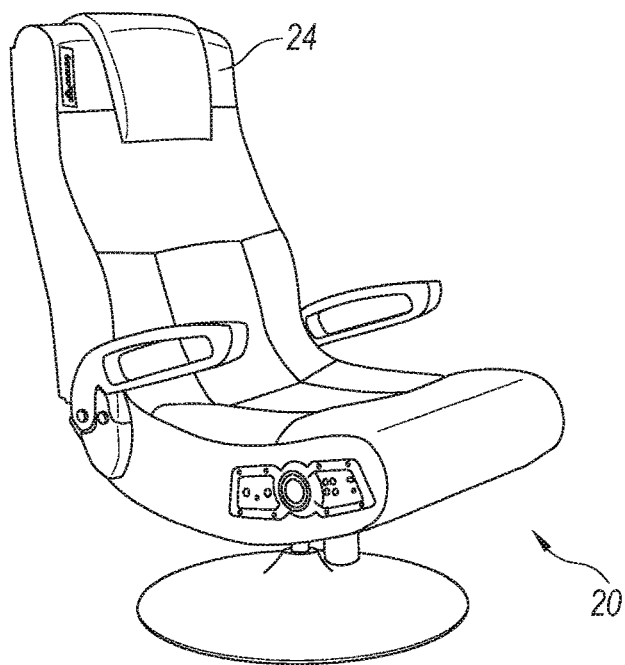
FIG. 5C is an illustration of an embodiment of a gaming chair including two cap regions of fastening material

FIG. 5C is an illustration of an embodiment of a chair 20 including two cap regions of fastening material 24. The chair 20 of FIG. 5C includes a cap region that is split into two sections for two separate sections of fastening material 24.

Figure 6:
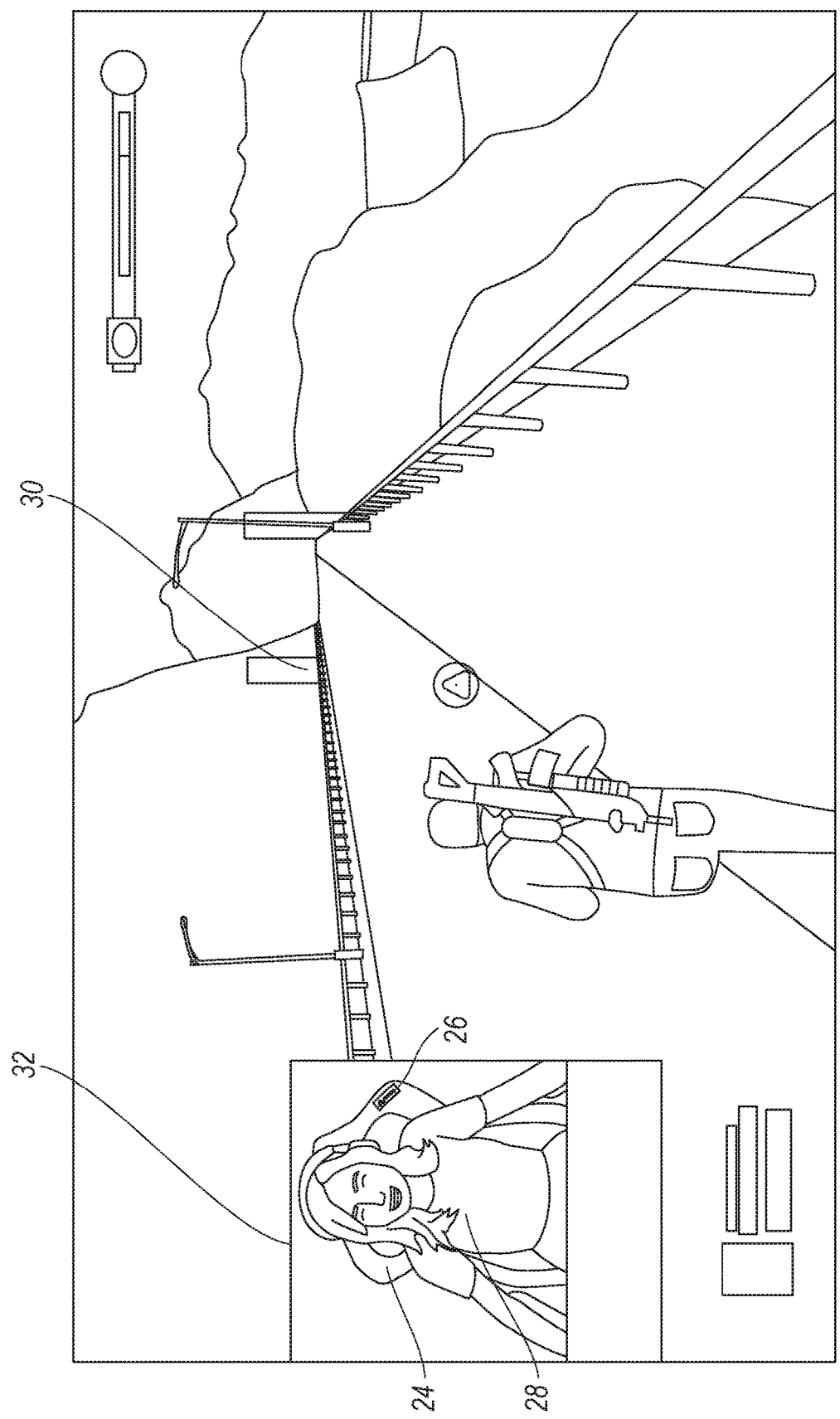
FIG. 6 is an illustration of a frame of a gamer video stream where the user is sitting in a gaming chair.

FIG. 6 is an illustration of a frame of a gamer video stream where the user is sitting in a chair 20. The chair 20 appears in video frame 30 (here, streaming video of the broadcaster 28 gaming). The broadcaster 28 is included in a webcam portion 32 of the video data 30. The fastening material 24 along with the graphic patch 26 are visible over the broadcaster's shoulders and included in the video data 30. As pictured, the broadcaster 28 is filming herself and transmitting the video data 30 over the Internet.

Figure 7:
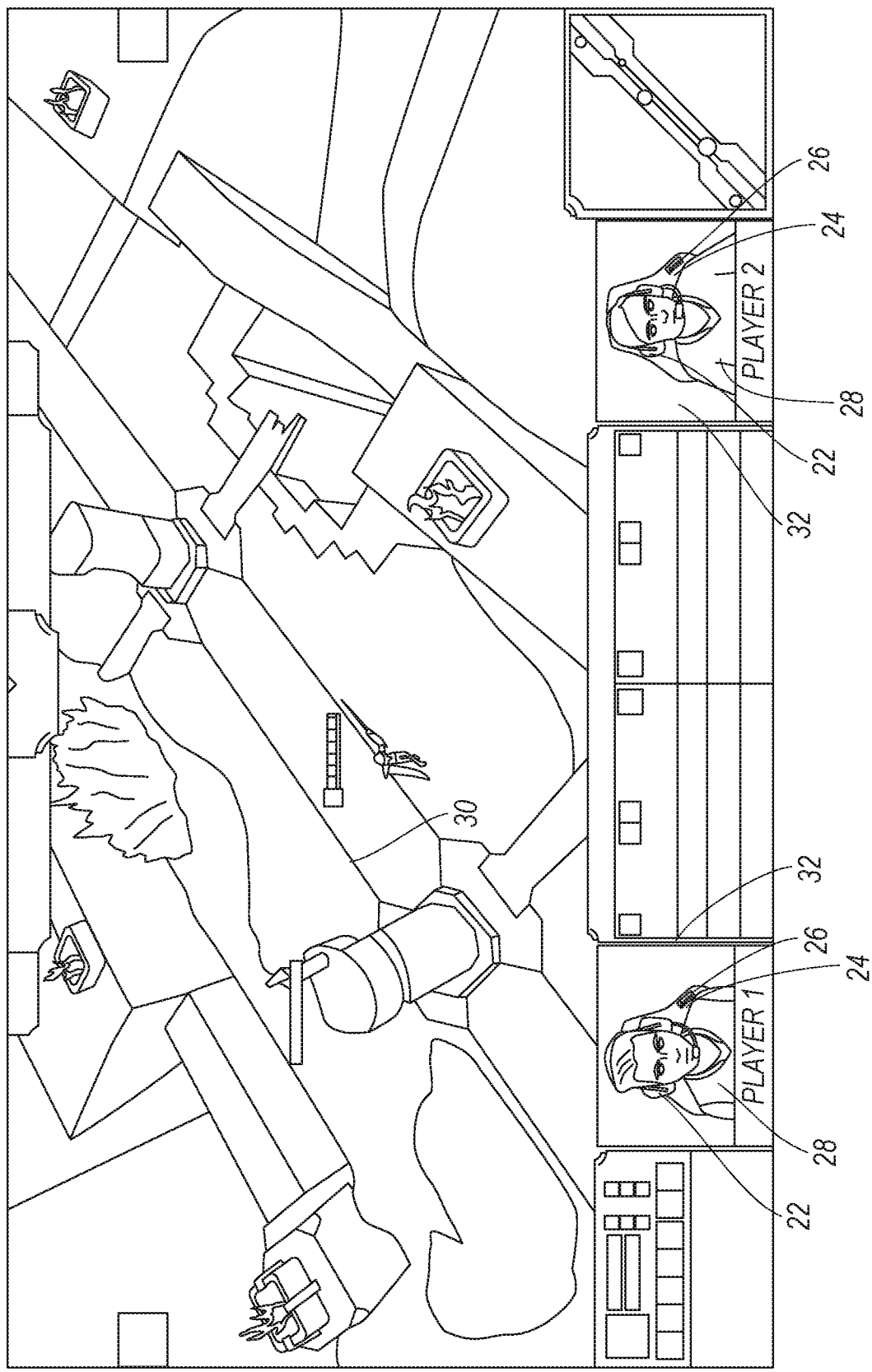
FIG. 7 is an illustration of a frame of a competitive gamer video stream where users are filmed by a third party and are sitting in respective gaming chairs.

FIG. 7 is an illustration of a frame of a competitive gamer video stream where users are filmed by a third party and are sitting in a chair 20. Similar to FIG. 6, FIG. 7 shows broadcasters 28 included in video frame 30 and broadcast while their chairs 20, and by extension, their graphic patches 26 on the fastening material 24 are visible in the webcam portion 32 of the video frame 30. Here, the broadcasters are being filmed by another party while they focus on an eSports competition.

Figure 8:
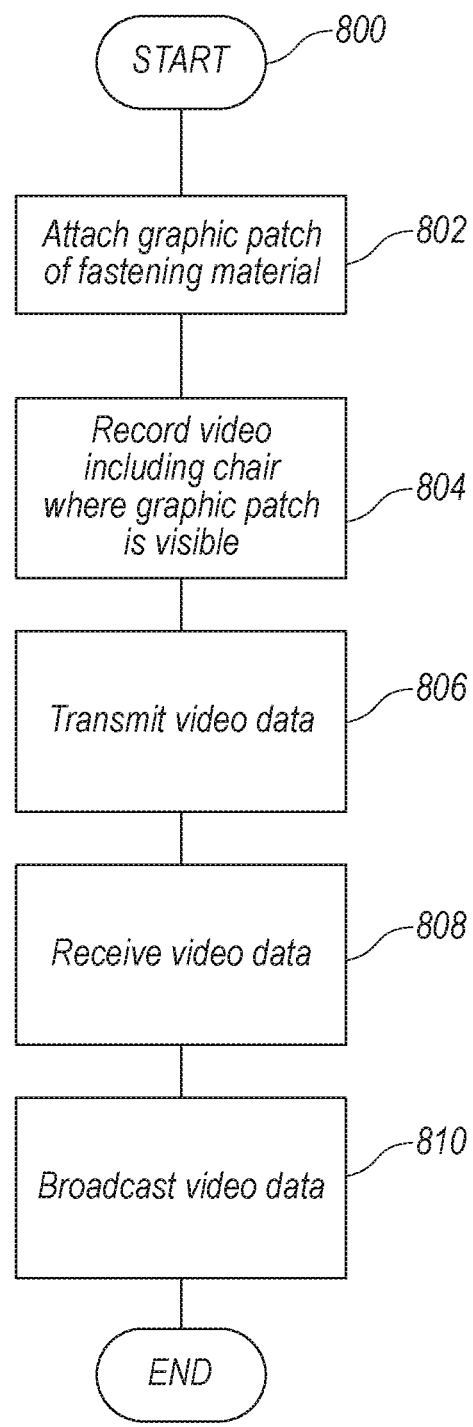
FIG. 8 is a flowchart illustrating a method of casting video data.

FIG. 8 is a flowchart illustrating a method of broadcasting video data. In step 802, the graphic patch affixes to the upper backrest region of the chair. The graphic patch can be removable. In step 804, a video device captures video data of the broadcaster in the chair. The video data includes renderings of the graphic patch visible while the broadcaster sits in the chair. In step 806, a computing device transmits the video data for broadcast. In some embodiments the transmission of the video data is an upload to a streaming video service. In step 808, a broadcasting service receives the video data. In step 810, the broadcasting service broadcasts the video data.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

The invention claimed is:

1. A chair comprising:
   a chairback region positioned along a front-facing over-the-shoulder cap portion or front-facing wing portion of a chairback and above a lumbar region of the chairback; and
   a fastening material on an exterior of the chair over a cushion and covering the chairback region, the fastening material including at least a portion of a fastener to which a patch is to be removably affixed at a variable position and orientation, the fastening material having an area larger than an area of the patch.

2. The chair of claim 1, wherein the fastening material comprises at least one of:
   at least one of a hook portion or a loop portion of a hook-and-loop fastener;
   Micro-peg fabric
   magnetic fabric; or
   adhesive fabric.

3. A method of using the chair of claim 1 comprising:
   recording video data including a user seated in the chair wherein the graphic patch is visible in renderings of the video data; and
   transmitting the video data.

4. The method of claim 3, wherein said transmitting comprises uploading the video data to a streaming video service via a computer network.

5. The method of claim 3, further comprising:
   fastening the graphic patch to the fastening material.

6. A method of using the chair of claim 3 comprising:
   receiving video data including a user seated in the chair wherein the graphic patch is visible in renderings of the video data; and
   broadcasting the video data.

7. The chair of claim 1, wherein the chair is a video gaming chair.

8. The chair of claim 1, further comprising:
   a plurality of wheels;
   a reclining mechanism to enable the chair to recline; and
   a height adjustment mechanism to adjust the height of the chair.

9. The chair of claim 1, wherein the chairback region is visible while a user sits in the chair.

10. An apparatus comprising:
    a chair;
    a wing attached to a chairback of the chair;
    a fastening material mounted on a front-facing exterior of the chair only over a cushion of the wing; and
    a set of patches that removably fasten to the wing via the fastening material, the set of patches configured to fasten at variable positions and orientations on a surface of the wing.

11. The chair of claim 10, wherein the fastening material is any of:
    at least one of a hook portion or a loop portion of a hook-and-loop fastener;
    micro-peg fabric;
    magnetic fabric; or
    adhesive fabric.

12. A method of using the apparatus of claim 10 comprising:
    recording video data including a user seated in the chair wherein the graphic patch is visible in renderings of the video data; and
    transmitting the video data.

13. A chair comprising:
    a seat elevated from floor level;
    a backrest attached to the seat;
    a set of chair wings extending outward from the backrest beyond where a user's shoulders rest when the user is seated on the seat; and
    a fastening material mounted on a front-facing exterior of the chair over a cushion of the set of chair wings, the fastening material configured in a shape that enables a set of patches to removably fasten to the set of chair wings at variable positions and orientations on a surface of the set of chair wings, the fastening material having an area larger than an area of the patch.

14. The chair of claim 13, wherein the fastening material is any of:
    at least one of a hook portion or a loop portion of a hook-and-loop fastener;
    micro-peg fabric;
    magnetic fabric; or
    adhesive fabric.

15. The chair of claim 13, wherein the set of chair wings are positioned on the backrest above a lumbar region and below a head and neck region.

16. The chair of claim 13, further comprising:
a patch removably fastened to the fastening material.

17. A method of using the chair of claim 14 comprising:
recording video data including a user seated in the chair wherein the graphic patch is visible in renderings of the video data; and
transmitting the video data.

18. The method of claim 17, wherein said transmitting is uploading the video data to a streaming video service via the Internet.

* * * * *